(12) United States Patent
Moeckel et al.

(10) Patent No.: US 10,221,859 B2
(45) Date of Patent: Mar. 5, 2019

(54) TURBINE ENGINE COMPRESSOR BLADE

(71) Applicant: General Electric Company, Schenectady, NY (US)

(72) Inventors: Curtis William Moeckel, Cincinnati, OH (US); Peter John Wood, Loveland, OH (US); Matthew Ford Adam, West Chester, OH (US); Eric Andrew Falk, Liberty Township, OH (US); Mark Joseph Stecher, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 15/018,126

(22) Filed: Feb. 8, 2016

(65) Prior Publication Data
US 2017/0227016 A1 Aug. 10, 2017

(51) Int. Cl.
*F04D 29/32* (2006.01)

(52) U.S. Cl.
CPC .................. *F04D 29/324* (2013.01)

(58) Field of Classification Search
None
See application file for complete search history.

(56) References Cited

U.S. PATENT DOCUMENTS

| 5,031,313 | A | * | 7/1991 | Blair ...................... B23P 6/002 29/402.06 |
| 5,167,489 | A | | 12/1992 | Wadia et al. |
| 6,331,100 | B1 | | 12/2001 | Liu et al. |
| 6,899,526 | B2 | | 5/2005 | Doloresco et al. |
| 7,189,055 | B2 | | 3/2007 | Marini et al. |
| 7,189,056 | B2 | | 3/2007 | Girgis et al. |
| 7,244,104 | B2 | | 7/2007 | Girgis et al. |
| 7,484,355 | B2 | | 2/2009 | Blin et al. |
| 7,641,446 | B2 | | 1/2010 | Harvey |
| 7,971,882 | B1 | | 7/2011 | Liang |
| 8,075,268 | B1 | | 12/2011 | Liang |
| 8,684,698 | B2 | | 4/2014 | Breeze-Stringfellow et al. |
| 8,702,398 | B2 | | 4/2014 | Breeze-Stringfellow et al. |
| 8,714,918 | B2 | | 5/2014 | Tibbott et al. |

(Continued)

FOREIGN PATENT DOCUMENTS

| CN | 103270313 A | 8/2013 |
| EP | 2 199 543 A2 | 6/2010 |
| EP | 2 990 602 A1 | 3/2016 |

OTHER PUBLICATIONS

Leroy H. Smith, Jr. et. al, "Sweep and Dihedral Effects in Axial-Flow Turbomachinery", Transaction of the ASME, Sep. 1963.

(Continued)

*Primary Examiner* — Igor Kershteyn
*Assistant Examiner* — Theodore Ribadeneyra
(74) *Attorney, Agent, or Firm* — General Electric Company; Pamela Kachur

(57) ABSTRACT

An airfoil for a compressor blade of a gas turbine engine has a chord between a leading edge and a trailing edge and a span between a root and a tip. The airfoil can further include a reduction in local chord from about 75% span to the tip for about a 5% reduction in local solidity. The airfoil can have decreasing sweep angles for the leading edge and the trailing edge from 50% span to the tip and can have decreasing leading and trailing edge dihedral angles from 50% span to the tip.

17 Claims, 6 Drawing Sheets

(56) References Cited

U.S. PATENT DOCUMENTS

| | | | |
|---|---|---|---|
| 9,017,036 B2 | 4/2015 | Straccia | |
| 2005/0106030 A1* | 5/2005 | Bachofner | F01D 5/141 416/235 |
| 2010/0260609 A1 | 10/2010 | Wood et al. | |
| 2011/0268578 A1* | 11/2011 | Praisner | F01D 5/141 416/241 R |
| 2012/0243975 A1* | 9/2012 | Breeze-Stringfellow | F01D 5/141 415/173.1 |
| 2013/0272880 A1 | 10/2013 | Boeck | |
| 2013/0323065 A1 | 12/2013 | Murooka | |
| 2014/0000280 A1* | 1/2014 | Allen-Bradley | F01D 5/141 60/805 |
| 2014/0000281 A1* | 1/2014 | Nash | F01D 5/141 60/805 |
| 2014/0010650 A1 | 1/2014 | Zelesky et al. | |
| 2014/0248155 A1 | 9/2014 | Merville et al. | |
| 2014/0356154 A1 | 12/2014 | Iliopoulou | |
| 2015/0001811 A1 | 1/2015 | Feldmann et al. | |

OTHER PUBLICATIONS

Extended European Search Report and Opinion issued in connection with corresponding EP Application No. 17154878.7 dated Jun. 16, 2017.

Machine translation and Chinese Office Action issued in connection with corresponding CN Application No. 201710069671.7 dated Jul. 2, 2018.

* cited by examiner

TURBINE ENGINE COMPRESSOR BLADE

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are comprised of compressor stages designed with a plurality of bands of blades rotated by a rotor and bands of static vanes disposed between the blades. The compressor stages compress the air that is then moved to a combustor and a turbine. The compressor blades are disposed adjacent to shroud assemblies, however, a small volume of air passes through a clearance between the blade tip and the shroud. Blade sensitivity to this clearance can reduce efficiency and overall performance of the compressor.

BRIEF DESCRIPTION OF THE INVENTION

In one aspect, an airfoil for a compressor blade of a gas turbine engine including an outer surface having a leading edge and a trailing edge defining a chord-wise direction and a root and a tip defining a span-wise direction. The airfoil further includes a reduction in local chord from about 75% span to the tip, a leading and trailing edge sweep angle that is decreasing from 50% span to the tip, and a leading and trailing edge dihedral angle that is decreasing from 50% span to the tip.

In another aspect, an airfoil for a compressor blade of a gas turbine engine includes an outer surface defining a suction side and a pressure side, extending chord-wise from a leading edge to a trailing edge, and span-wise from a root to a tip. The airfoil further includes a reduction in local chord from about 75% span to the tip resulting in a local reduction in solidity, and a leading edge and trailing edge dihedral that is decreasing from 50% span to the tip.

In yet another aspect, a method of improving airfoil performance for a gas turbine engine airfoil with a root and a tip defining a span-wise direction and a leading edge and a trailing edge defining a chord-wise direction. The method includes reducing the chord from 75% span to the tip, decreasing a leading edge and trailing edge sweep from 50% span to the tip, and decreasing a leading edge and trailing edge dihedral from 50% span to the tip.

DESCRIPTION OF EMBODIMENTS OF THE INVENTION

Figure 1:
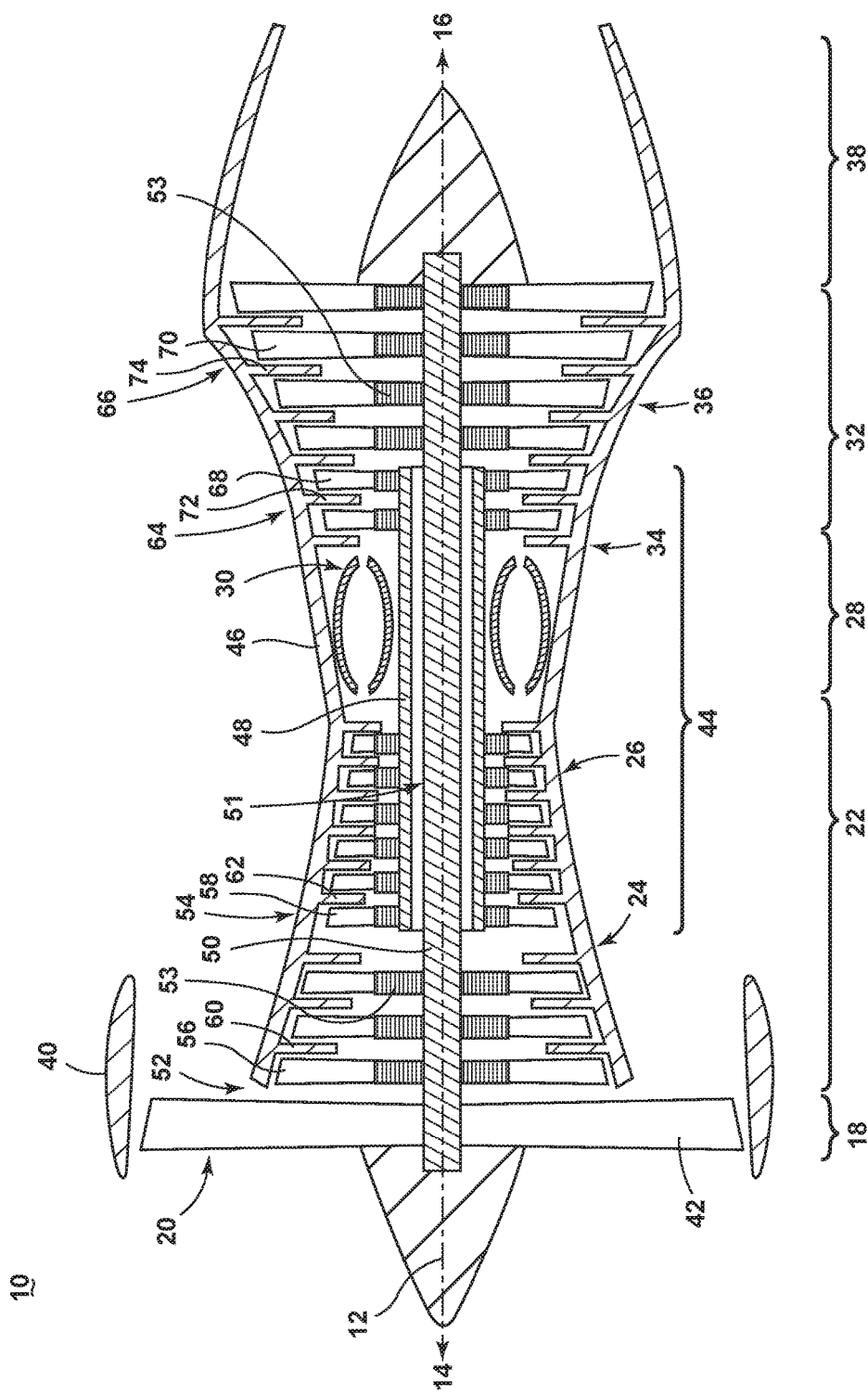
FIG. 1 is a schematic cross-sectional diagram of a gas turbine engine for an aircraft.

The described embodiments of the present invention are directed to a turbine compressor airfoil which can comprise a blade mounted to a rotor. For purposes of illustration, the present invention will be described with respect to a compressor blade for an aircraft gas turbine engine. It will be understood, however, that the invention is not so limited and can have general applicability in non-aircraft applications, such as other mobile applications and non-mobile industrial, commercial, and residential applications. It can also have application to airfoils, other than a blade, in a turbine engine, such as stationary vanes.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

It should be understood that as used herein, the terms "dihedral" or, alternatively, "dihedral angle" and "sweep" or, alternatively, "sweep angle" as used herein, are conventional terms used in the design of airfoils (see, for example, Leroy H. Smith, J R. et. al, "Sweep and Dihedral Effects in Axial-Flow Turbomachinery", Transaction of the ASME, September, 1963).

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor spools 52, 54, in which a set of compressor blades 56, 58 rotate relative to a corresponding set of static compressor vanes 60, 62 to compress or pressurize the stream of fluid passing through the stages. Multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract power from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some power is extracted from these gases by the HP turbine 34, which drives the HP compressor 26. The combustion gases are discharged into the LP turbine 36, which extracts additional power to drive the LP spool 50 to rotate the fan 20 and the LP compressor 24. The exhaust gas is ultimately discharged from the engine 10 via the exhaust section 38.

Figure 2:
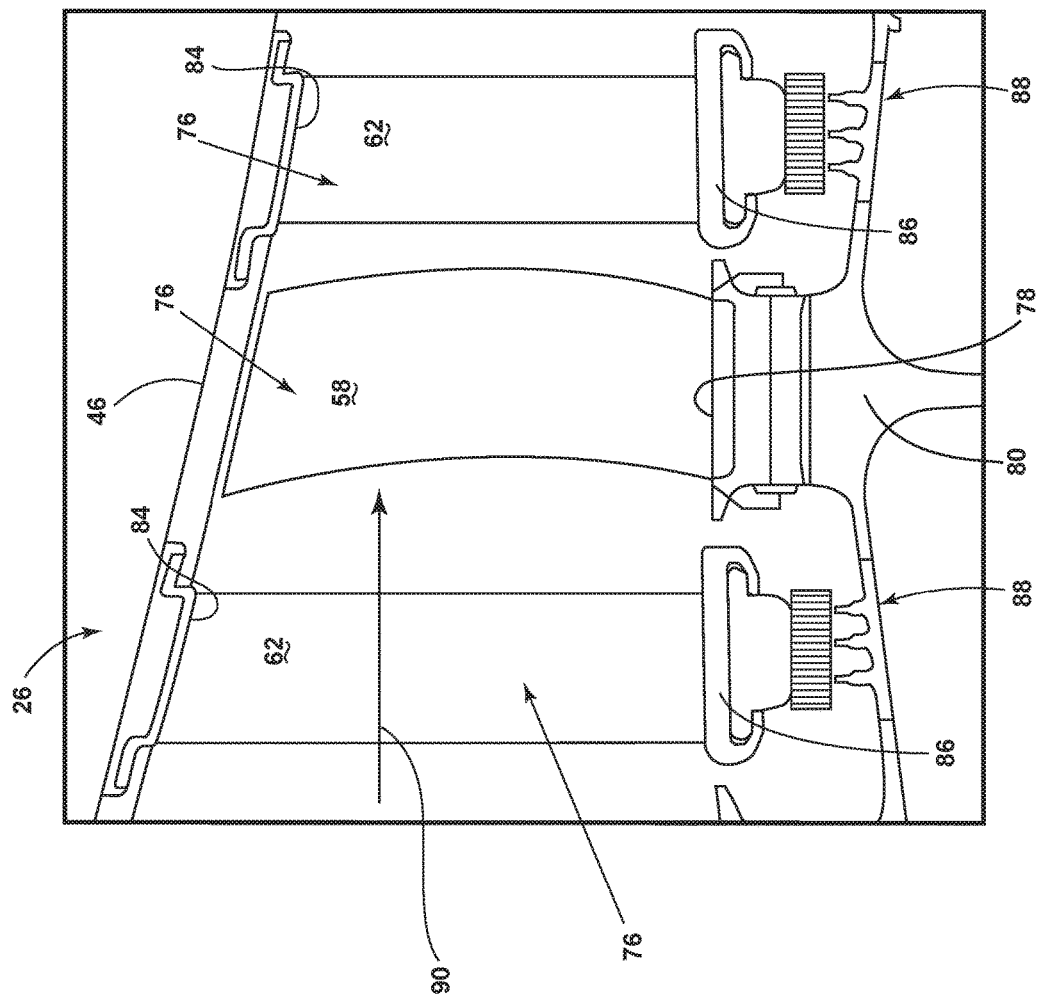
FIG. 2 is a cross-sectional view a compressor section of FIG. 1.

FIG. 2 shows the HP compressor section 26 of FIG. 1 comprising one compressor blade 58 and two compressor vanes 62, both of which can comprise an airfoil 76. Each combination of one circumferential ring of vanes 62 and one circumferential ring of blades 58 can comprise a compressor stage. The blades 58 mount to a platform 78 for supporting the blades 58. The platform 78 mounts to an annular rotor 80 that rotates relative to the centerline 12 of the engine 10, such that multiple blades 58 can be disposed around the rotor 80.

The vanes 62 can mount to the core casing 46, being radially disposed around the engine centerline 12 similar to the blades 58, with the vanes 62 mounting between an outer band 84 and an inner band 86. A seal 88 can be disposed adjacent to the radially inner ends of the vanes 62 adjacent to the inner band 86, such that airflow is retarded from leaking from downstream of the vanes 62 to upstream of the vanes 62. The vanes 62 do not need to mount to the inner band 86, but can be cantilevered with a hub clearance between the vane 62 and the rotor 80. As applied to stator airfoils, or vanes, this would be directed to cantilevered vanes that have the hub clearance. During engine operation, a mainstream airflow 90 moves in a forward to aft direction through the HP compressor 26, being moved by the blades 58 and directed by the vanes 62.

Figure 3:
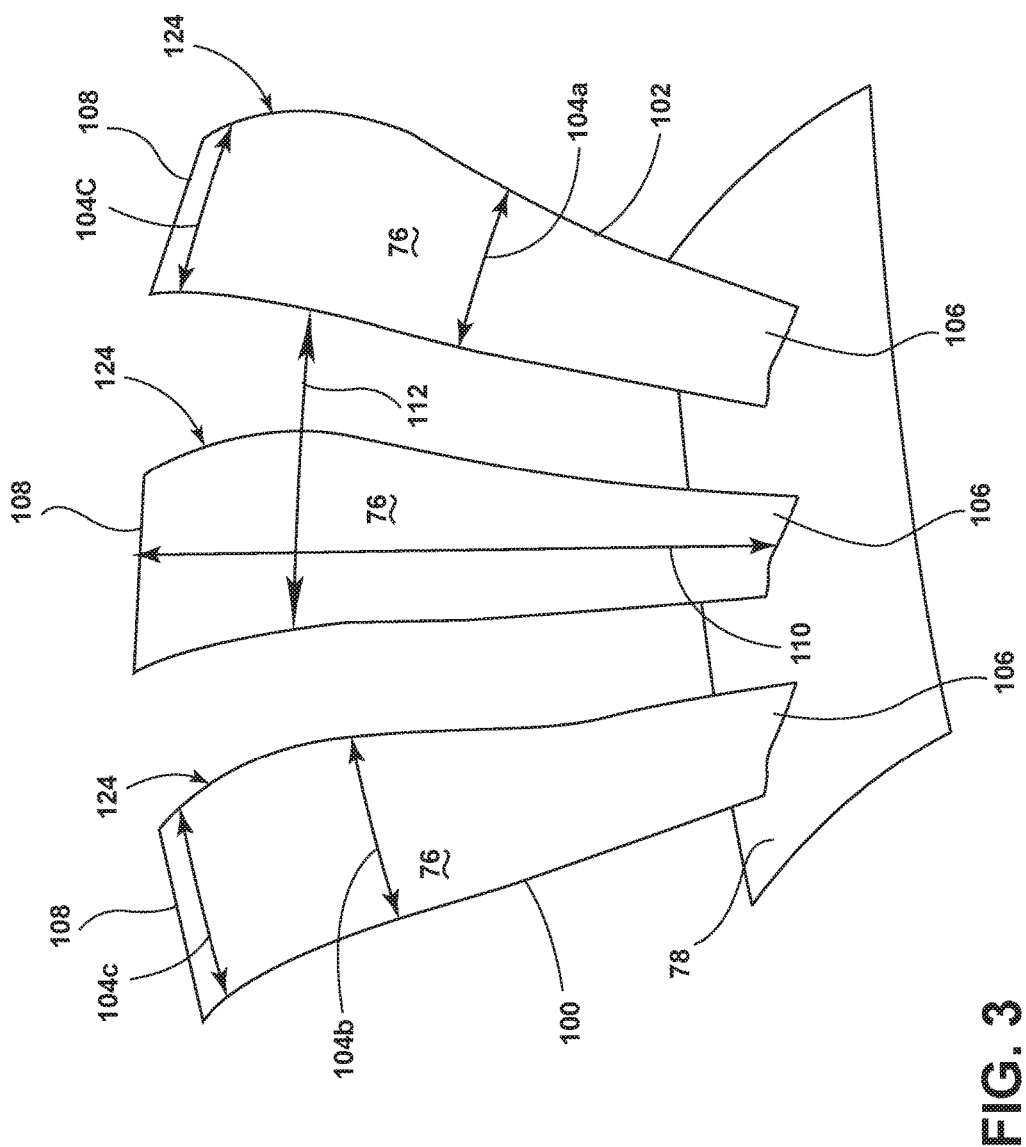
FIG. 3 is a isometric view of a reduction in local chord of an airfoil of FIG. 2.

Looking at FIG. 3, viewed from aft looking forward, an exemplary section of the platform 78 includes three airfoils 76. Each airfoil 76 includes an outer surface having a leading edge 100 and a trailing edge 102 defining a chord 104*a-c* defining a chord-wise distance between the leading and trailing edges 100, 102. Each airfoil 76 also has a root 106 and a tip 108 defining a span 110 as a span-wise direction of the airfoil 76.

The airfoils 76 can further have a solidity. The solidity can be defined by the ratio of the chord 104*a* to a pitch 112 at a given radial distance, being Solidity=Chord/Spacing ($\sigma$=C/S), where S is the pitch or circumferential spacing. Thus, it should be appreciated that as the chord 104*a* increases or decreases, the solidity $\sigma$, being directly proportional to chord 104*a*, will increase or decrease respective of the chord 104*a*. As spacing increases, the solidity will decrease, being inversely proportional to one another. The solidity for the airfoil 76 can be determined at any radial distance along the span 110. The chord 104*b*, for example, can be determined at about 75% of the span 110, but can be determined at any radial distance for purposes of determining the solidity.

Each airfoil 76 further has a reduction in local chord 124 from about 75% of the span 110 to the tip 108. The reduction of local chord 124 generates a decrease in solidity, with solidity being directly proportional to chord. Alternatively, the reduction in local solidity need not be resultant of a decreasing chord, but respective of the spacing increase resultant of a larger circumference moving radially outward.

The leading and trailing edges 100, 102 can have a decreasing sweep angle, such that the sweep angles for the leading and trailing edges 100, 102 at the tip 108 are negative. Additionally, the dihedral angles for the leading and trailing edges 100, 102 can be decreasing such that the dihedral angles at the tip 108 are negative.

Figure 4:
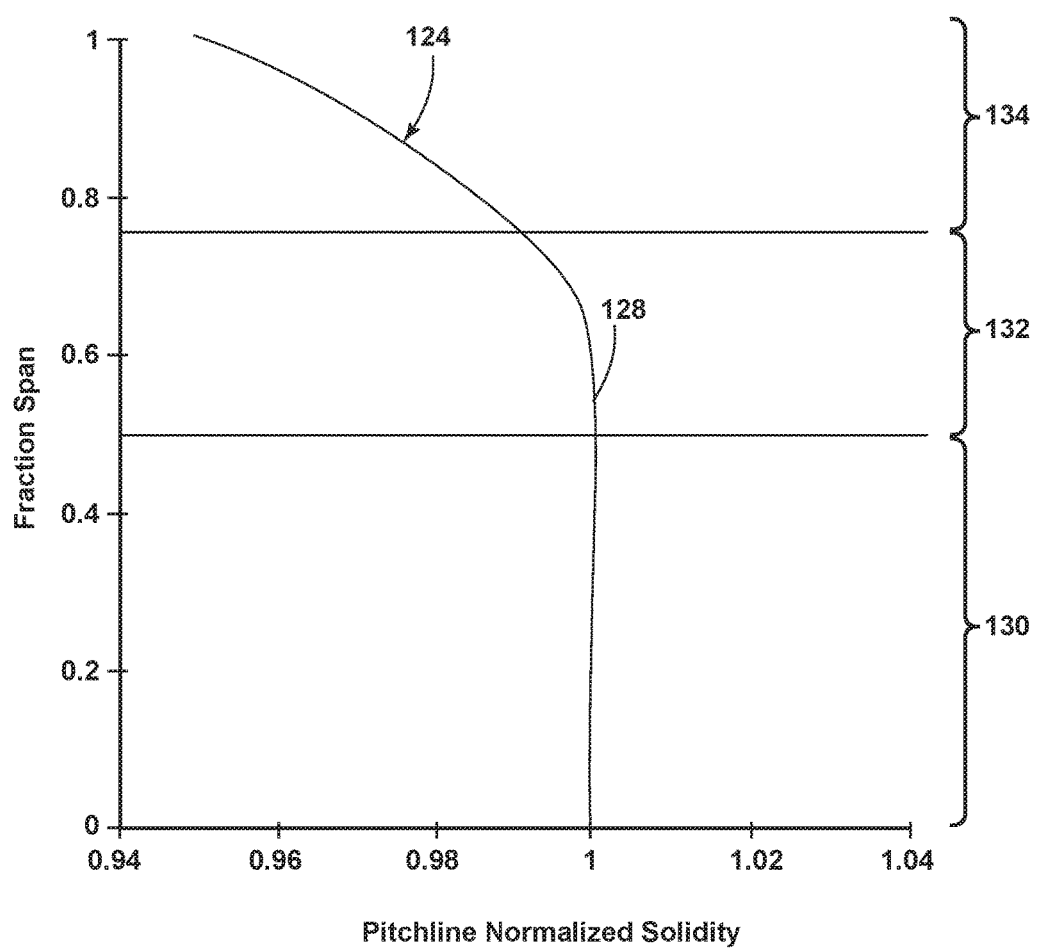
FIG. 4 is a plot illustrating a decrease in local solidity resultant of the reduction in local chord of FIG. 3.

In FIG. 4, a plot illustrates the solidity 128 along the span 110 of the airfoil 76. The airfoil 76 has a generally consistent solidity 128 from the root 106 to about 50% span 110 shown as an inner zone 130, having a normalized solidity value of about 1.00 or 100%. From about 50% span 110 to 75% span 110, a transitioning zone 132 includes a transition from a constant solidity to a decreasing solidity. At an outer zone 134, from about 75% span 110 to the tip 108, the reduction in local chord 124 results in a decrease in solidity 128, having a reduction in local solidity of about 0.05 or 5% at the tip 108.

Sweep is a conventional parameter represented by a local sweep angle which is defined in the plane of the airfoil mean surface which is aligned with the local metal meanline angle.

The local sweep angle is the angle between the radial direction and the local tangent to the airfoil edge or stringer shape within the plane of the airfoil mean surface. The sweep angle is defined in detail in the U.S. Pat. No. 5,167,489, and is incorporated herein by reference. In the sign convention commonly used in the art, the sweep angle is represented as a negative value for forward sweep, and a positive value for aft sweep.

Figure 5:
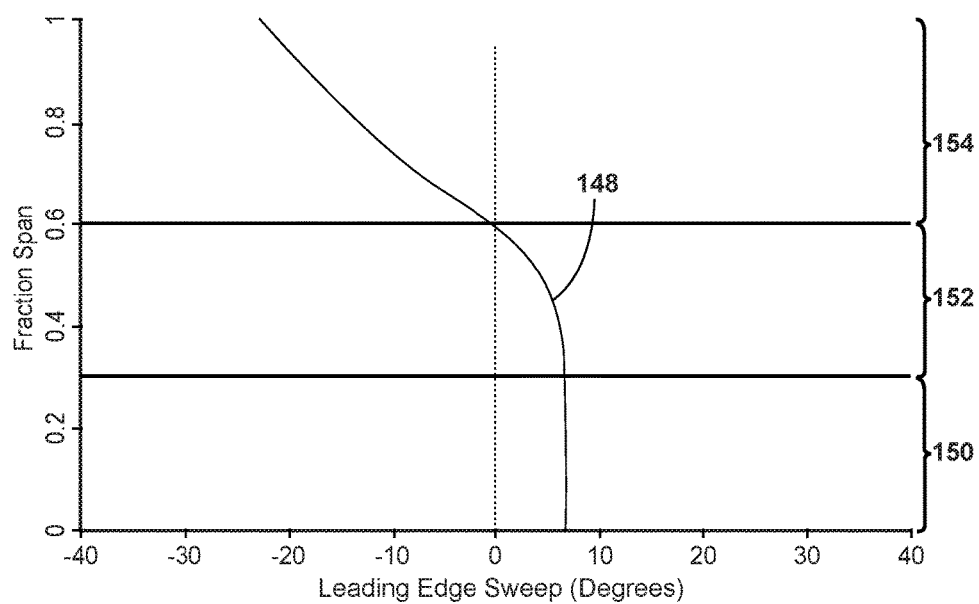
FIG. 5 is a plot illustrating a leading edge sweep angle for the airfoil of FIG. 3.

Looking now at FIG. 5, a plot for the leading edge sweep angle 148 illustrates the orientation for the leading edge 100 of the airfoil 76 of FIG. 3. The shape of the airfoil 76 can define an aft swept region 150 from the root 106 to about 30% span 110, a transition region 152 from about 30% span 110 to 60% span 110, and a negative region 154 from about 60% span 110 to the tip 108. It should be understood that the regions 150, 152, 154 as defined are exemplary, and reasonable variation is contemplated. Within the aft swept region 150, the leading edge sweep angle 148 at the root 106 is positive and constant, having a sweep angle 148 of about 7 degrees to about 30% span 110. The transition region 152 includes a transition from the constant sweep angle 148 to a decreasing sweep angle 148, while remaining positive. The leading edge sweep angle 148 is decreasing from 50% span 110 to the tip 108, while it is contemplated that the leading edge sweep angle 148 can become decreasing radially inward of 50% span 110. In the negative region 154, the leading edge sweep angle 148 is decreasing and negative until it terminates at the tip 108 having a negative sweep angle 148 of about negative 22 degrees. From the transition region 152 to the tip 108, the leading edge sweep angle 148 can decrease between about 26-30 degrees. The leading edge sweep angle 148 can be negative from 60% span 110 to the tip 108.

Figure 6:
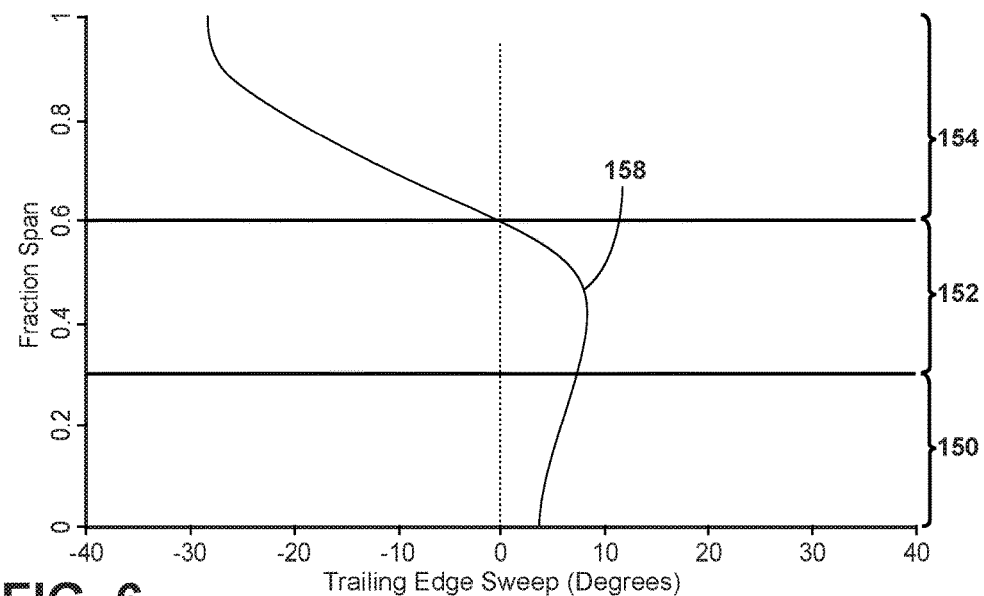
FIG. 6 is a plot illustrating a trailing edge sweep angle for the airfoil of FIG. 3.

Turning now to FIG. 6, another plot illustrates the trailing edge sweep angle 158 for the airfoil 76 of FIG. 3, having the same regions 150, 152, 154 as illustrated in FIG. 5. The trailing edge sweep angle 158 at the root 106 is initially positive at about 5 degrees. Within the aft swept region 150, the trailing edge sweep angle 158 is increasing. In the transition region 152, the trailing edge sweep angle 158 transitions from increasing to decreasing, while remaining positive until it becomes about 0 degrees at 60% span 110. The trailing edge sweep angle 158 is decreasing from 50% span 110 to the tip 108, while it is contemplated that the trailing edge sweep angle can become decreasing radially inward of 50% span. Within the negative region 154, the trailing edge sweep angle 158 is continuously decreasing and is negative, having the sweep angle 158 at the tip 108 of about negative 29 degrees. The trailing edge sweep angle 158 from the transition region 152 to the tip 108 can decrease by about 32-36 degrees. The trailing edge sweep angle 158 can be negative from 60% span 110 to the tip 108.

The dihedral angle, as used herein can be defined at any location on the airfoil 76, such as the leading edge 100 and trailing edge 102. A negative dihedral angle at a point on the airfoil 76 means that the axis orthogonal to the pressure surface of the airfoil at that location is angled towards the engine centerline 12. A positive dihedral angle points in the opposite direction, away from the engine centerline 12. It should be further understood that as used herein, a positive dihedral angle or distance is in the direction opposite of the rotation of the airfoil 76 and a negative dihedral angle or distance is in a direction of the direction of rotation of the airfoil 76.

Figure 7:
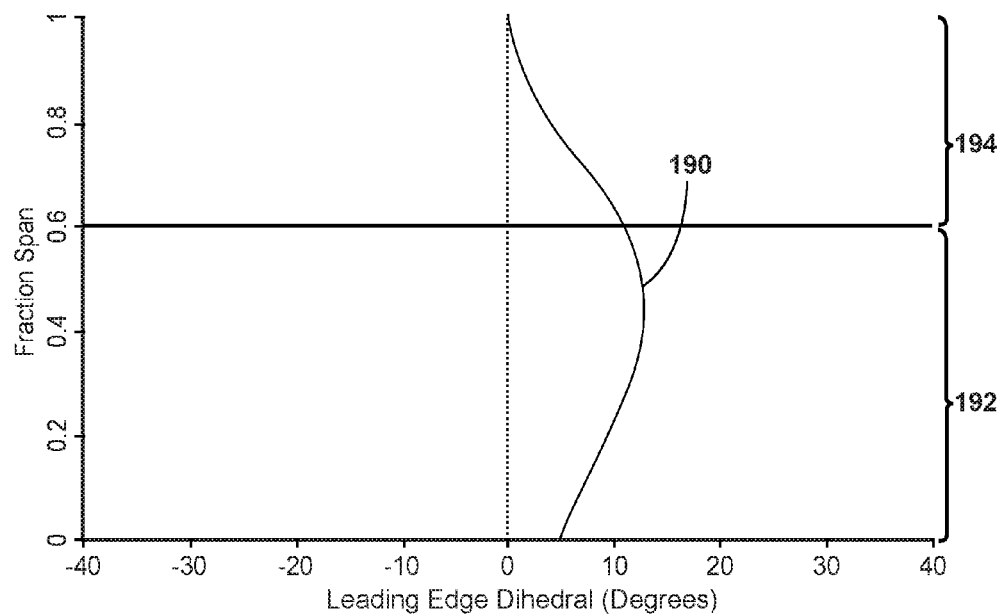
FIG. 7 is a plot illustrating the leading edge dihedral for the airfoil of FIG. 3.

Looking at FIG. 7, another plot illustrates a leading edge dihedral angle 190 for the airfoil 76, having a root region 192 from the root 106 to 60% span 110 and a tip region 194 from 60% span 110 to the tip 108. The leading edge dihedral angle 190 at the root 106 is initially positive. During the root section 192, the dihedral angle 190 is positive, having an increasing dihedral angle 190 from the root 106 to about 40% span 110 where the dihedral angle 190 transitions to decreasing. The leading edge dihedral angle 190 is decreasing from 50% span 110 to the tip 108, while it is contemplated that the leading edge dihedral can become decreasing radially inward of 50% span. Within the tip region 194, the dihedral angle 190 is continuously decreasing, having a dihedral angle 190 of between 0-5 degrees between 80% span 110 to the tip 108 and having about a 0 degree dihedral at the tip 108. Alternatively, a dihedral angle 190 that is not continuously decreasing is contemplated.

Figure 8:
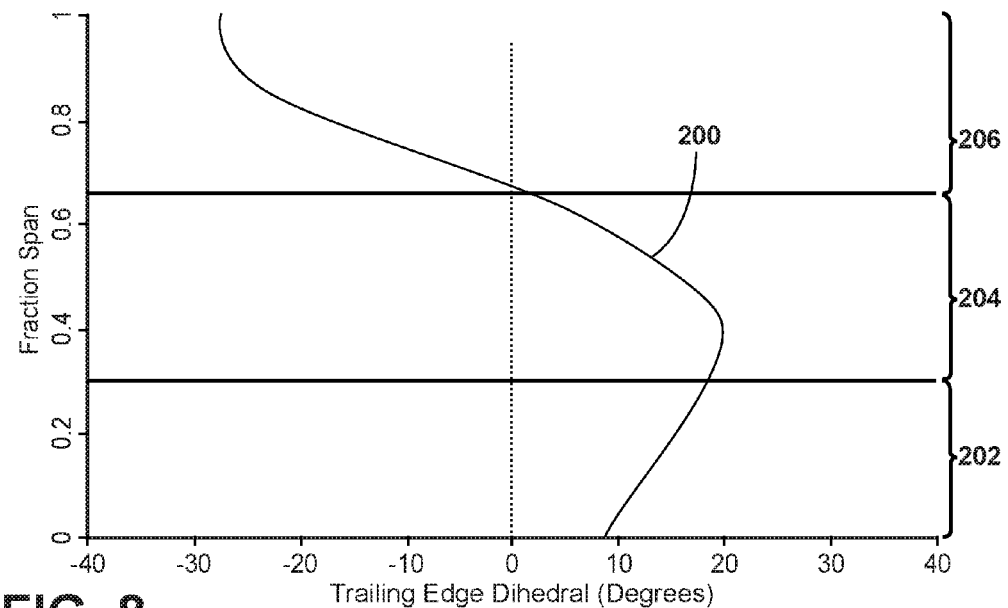
FIG. 8 is a plot illustrating the trailing edge dihedral for the airfoil of FIG. 3.

Turning now to FIG. 8, another plot illustrates a trailing edge dihedral angle 200 for the airfoil 76 is shown, having a root region 202 from the root 106 to 30% span 110, a middle region 204 from 30% span 110 to about 65% span 110, and a tip region 206 from about 65% span 110 to the tip 108. The trailing edge dihedral angle 200 can be increasing within the root region 202, having a positive dihedral angle 200 at the root 106 of about 8 degrees. During the middle region 204, the trailing edge dihedral angle 200 transitions from increasing to decreasing, while remaining positive. The trailing edge dihedral angle 200 is decreasing from 50% span 110 to the tip 108, while it is contemplated that the leading edge dihedral can become decreasing radially inward of 50% span. Within the tip region 206, the trailing edge dihedral angle 200 is continuously decreasing and becomes negative at about 65% span 110. The trailing edge dihedral angle 200 at the tip 108 can be about negative 28 degrees and can be negative from about 65% span 110 to the tip 108. The decrease in the trailing edge dihedral angle 200 can be between 45-50 degrees between 40% span 110 to the tip 108, or can be 40-45 degrees from 50% span 110 to the tip 108.

It should be appreciated that the reduction in local chord from 75% span 110 to the tip 108 results in a local decrease in solidity of about 5% at the tip 108. The decreasing sweep angles 148, 158 for the leading and trailing edges 100, 102 from 50% span 110 and the decreasing leading and trailing edge dihedral angles 190, 200 from 50% span 110 to the tip 108 provides improved airflow for the leading edge at the tip and improved efficiency for the trailing edge at the tip resulting in improved overall airfoil performance.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. An airfoil for a compressor blade of a gas turbine engine comprising:
   an outer surface having a leading edge and a trailing edge defining a chord-wise direction and a root and a tip defining a span-wise direction;
   a reduction in local chord from about 75% span to the tip;

a leading edge and trailing edge sweep angle that is continuously decreasing along the entirety of the leading edge and the trailing edge from 50% span to the tip; and a leading edge and trailing edge dihedral angle that is continuously decreasing along the entirety of the leading edge and the trailing edge from 50% span to the tip.

2. The airfoil of claim 1 wherein the reduction in local chord results in a reduction in solidity from 75% span to the tip.

3. The airfoil of claim 2 wherein the reduction in solidity at the tip is about 5%.

4. The airfoil of claim 3 wherein the solidity from 0% to 50% span is about constant.

5. The airfoil of claim 1 wherein the leading edge and trailing edge sweep angles are negative from 60% span to the tip.

6. The airfoil of claim 1 wherein the leading edge dihedral angle at the tip is about 0 degrees relative to an axis orthogonal to a pressure surface.

7. The airfoil of claim 1 wherein:
the local chord reduction results in about a 5% reduction in solidity at the tip,
the leading edge and trailing edge sweep angles are negative from about 60% span to the tip,
the leading edge dihedral angle at the tip is about 0 degrees, and
the trailing edge dihedral angle is negative from about 65% span to the tip.

8. An airfoil for a compressor blade of a gas turbine engine comprising:
an outer surface having a leading edge and a trailing edge defining a chord-wise direction and a root and a tip defining a span-wise direction;
a reduction in local chord from about 75% span to the tip;
a leading edge and trailing edge sweep angle that is continuously decreasing from 50% span to the tip; and
a leading edge and trailing edge dihedral angle that is continuously decreasing from 50% span to the tip;
wherein the leading edge and trailing edge sweep angles are negative from 60% span to the tip; and
wherein the leading edge sweep angle at the tip is between 26-30 degrees less than at a transition region of about 30%-60% span, and the trailing edge sweep angle at the tip is between 32-36 degrees less than at the transition region.

9. An airfoil for a compressor blade of a gas turbine engine comprising:
an outer surface having a leading edge and a trailing edge defining a chord-wise direction and a root and a tip defining a span-wise direction;
a reduction in local chord from about 75% span to the tip;
a leading edge and trailing edge sweep angle that is continuously decreasing from 50% span to the tip; and
a leading edge and trailing edge dihedral angle that is continuously decreasing from 50% span to the tip;
wherein the leading edge dihedral angle at the tip is about 0 degrees relative to an axis orthogonal to a pressure surface; and
wherein the leading edge dihedral angle decreases from between 0-5 degrees from 80% span to the tip.

10. The airfoil of claim 9 wherein the trailing edge dihedral angle is negative from about 65% span to the tip.

11. The airfoil of claim 10 wherein the trailing edge dihedral angle changes from increasing to decreasing between 25% and 50% span.

12. An airfoil for a compressor blade of a gas turbine engine comprising:
an outer surface defining a suction side and a pressure side extending chord-wise from a leading edge to a trailing edge and span-wise from a root to a tip;
a reduction in local chord from 75% of span to the tip resulting in a local reduction in solidity; and
a leading edge and trailing edge dihedral angle that is continuously decreasing along the entirety of the leading edge and the trailing edge from 50% span to the tip.

13. The airfoil of claim 12 wherein the reduction in local solidity at the tip is about 5%.

14. The airfoil of claim 13 wherein the reduction in local solidity is substantially constant between 75% span and the tip.

15. The airfoil of claim 12 wherein the leading edge dihedral angle at the tip is about 0 degrees relative to an axis orthogonal to a pressure surface.

16. An airfoil for a compressor blade of a gas turbine engine comprising:
an outer surface defining a suction side and a pressure side extending chord-wise from a leading edge to a trailing edge and span-wise from a root to a tip;
a reduction in local chord from 75% of span to the tip resulting in a local reduction in solidity; and
a leading edge and trailing edge dihedral angle that is continuously decreasing from 50% span to the tip;
wherein the leading edge dihedral angle at the tip is about 0 degrees relative to an axis orthogonal to a pressure surface; and
wherein the leading edge dihedral angle decreases from between 0-5 degrees from 80% span to the tip.

17. The airfoil of claim 16 wherein the trailing edge dihedral angle is negative from 65% span to the tip.

* * * * *